United States Patent [19]

Scheu, Jr.

[11] 4,289,953
[45] Sep. 15, 1981

[54] ELECTRICALLY HEATED SOLDER EXTRACTOR

[76] Inventor: William E. Scheu, Jr., 22 Sedgemere Rd., Center Morchies, N.Y. 11934

[21] Appl. No.: 10,639

[22] Filed: Feb. 9, 1979

[51] Int. Cl.³ .......................... B23K 3/00; H05B 1/00
[52] U.S. Cl. ..................................... 219/230; 15/344; 219/236; 219/238; 219/533; 228/20; 228/53
[58] Field of Search ....................... 219/221, 227–230, 219/236–241, 533; 228/19–21, 51–55; 15/344

[56] References Cited

U.S. PATENT DOCUMENTS

| 3,121,781 | 2/1964 | Schoenwald | 219/237 |
|---|---|---|---|
| 3,248,034 | 4/1966 | McNutt | 219/238 X |
| 3,392,897 | 7/1968 | Siegel | 219/229 X |
| 3,690,539 | 9/1972 | Geiger | 219/229 X |
| 3,987,954 | 10/1976 | Litt | 228/20 |
| 4,023,724 | 5/1977 | Wakita et al. | 219/230 X |
| 4,086,465 | 4/1978 | Sylvester | 219/533 X |

FOREIGN PATENT DOCUMENTS 2004798  4/1979  United Kingdom ................. 228/20

Primary Examiner—A. Bartis
Attorney, Agent, or Firm—Howard C. Miskin

[57] ABSTRACT

A solder extractor includes a tubular heater and removable tip carrying front unit having a rear cowl of heat insulating material and a relatively oblique rear unit including a tubular handle of heat insulated material and having a front portion with longitudinal outer ribs telescoping the cowl and separably secured thereto by screws. A transparent solder receiver tube is separably housed in the handle and its front end releasably engages a seal plug carried by a conveyor tube extending from the heater bore and its rear end is sealed by a tube coupling carrying closure member which is releasably locked to the handle member. A cooperating window in the cowl and handle permit continuous viewing of the juncture of the tip extension and the solder receiver tube. The handle has a longitudinal channel which slidably houses an electric cable connected to the heater and permits the handle to be slid rearwardly on the cable when the handle is detached from the cowl.

8 Claims, 7 Drawing Figures

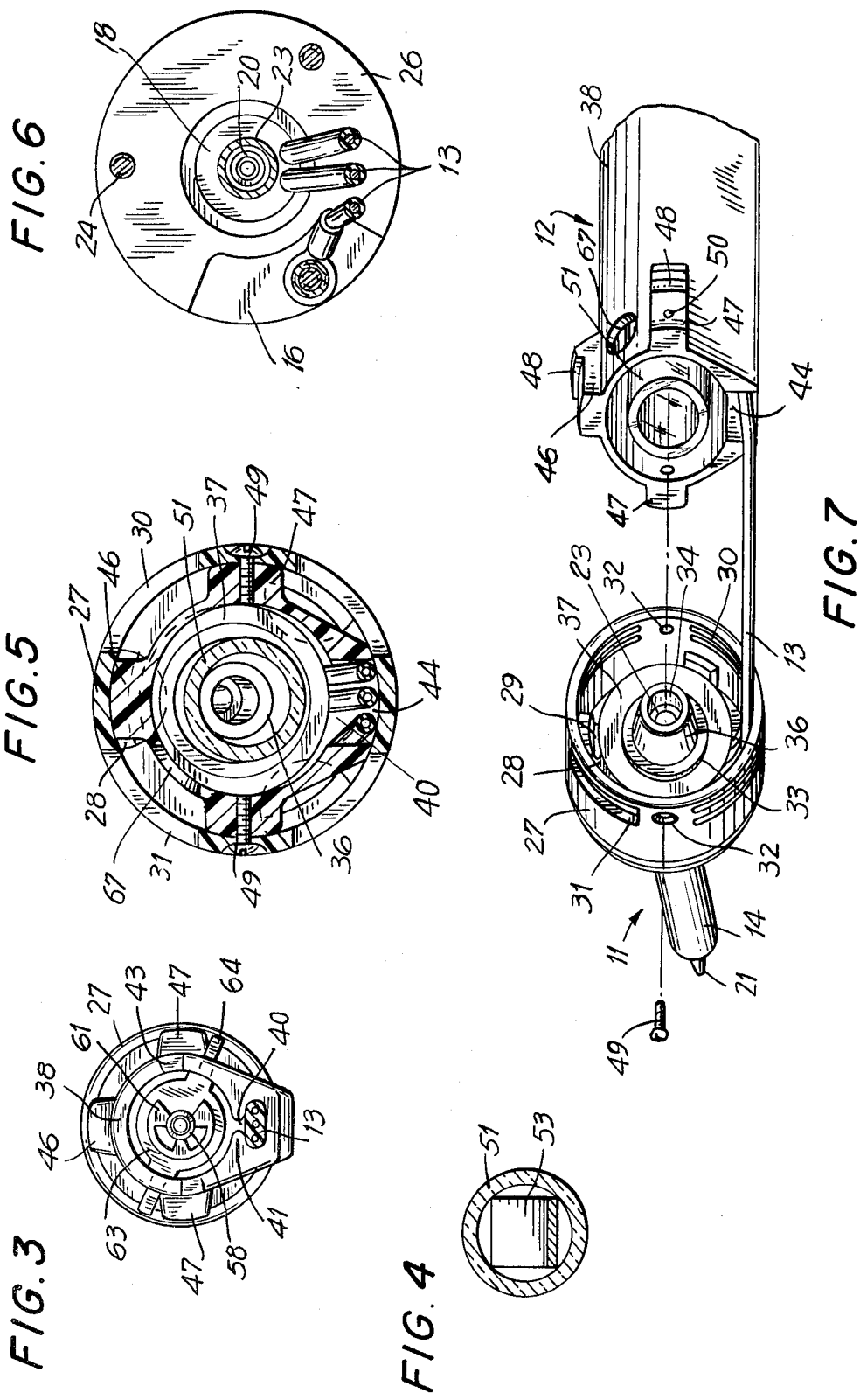

ELECTRICALLY HEATED SOLDER EXTRACTOR

BACKGROUND OF THE INVENTION

The present invention relates generally to improvements in tools for repairing electronic networks and it relates more particularly to an improved solder extractor.

In the servicing and repair of electrical and electronic circuit networks it is frequently necessary to replace electronic components or elements and to this end the melting and removal of solder joints or fillets are required. This procedure is commonly accomplished with a solder extractor which includes a heated tubular tip for melting the solder joint and a source of suction connected to the heated tubular tip by way of an enlarged receiver whereby the molten solder is sucked through the tubular tip and discharged into the receiver. However, the solder extractors heretofore available or proposed possess many drawbacks and disadvantages. The conventional solder extractor is often unreliable and hazardous, difficult, and awkward and time consuming to service and maintain, generally inconvenient to use, of little versatility and adaptability and otherwise leaves much to be desired.

SUMMARY OF THE INVENTION

It is a principal object of the present invention to provide an improved tool or instrument for the repair and servicing electronic and electrical service networks.

Another object of the present invention is to provide an improved solder extractor.

Still another object of the present invention is to provide an improved solder extractor which is highly convenient to use and of great versatility and adaptability.

A further object of the present invention is to provide an improved solder extractor of the above nature charterized by its being easy, simple and safe to service, repair and maintain, simple, rugged and reliable.

The above and other objects of the present inventor will become apparent from a reading of the following description taken in conjunction with the accompanying drawing which illustrate a preferred embodiment thereof.

A solder extractor device according to the present invention comprises separably connected working front and receiver and handle rear units and an electric power line extending through the rear unit into the front unit and permitting their separation, the front unit including a hollow rear cowl member with front and rear openings and formed of a heat insulating material, a tubular bracket secured to and projecting forwardly from the cowl member and housing an electrical heating member having an axial bore which releasably engages a forwardly projecting metal tubular tip member and a rearwardly projecting tube which terminates in a tubular seal member located in the cowl, the rear unit including a tubular outer handle formed of heat insulating material, a tubular receiver housed in the handle member and having a front end releasably engaging the seal member and sealed at its rear end by a separable closure member having a passageway therethrough terminating at its outer end in a conduit coupling for connection to a suction source and an electrical cable extends through the handle preferably slidably and is connected to the heater member.

Advantageously the tubular bracket is formed of metal and is oblique to the handle member and has longitudinally spaced circumferentially offset peripheral slots formed in its rear section to define vent openings and to reduce the longitudinal heat conductivity of the bracket and the bracket terminates at its rear in a peripheral flange which is screwed to the front of the cowl and is separated therefrom by a heat insulating gasket. The cowl is peripherally slotted and the handle member projects into the cowl and is spaced from the cowl inside face to provide venting passageways and the rear of handle member is similarly peripherally slotted. An aligned window in the cowl and in the handle overlie the junction of the tube and tubular receiver. The receiver is preferably a glass tube and houses a metal solder trap and the receiver rear closure includes an axially bored elastomeric plug seal engaging the receiver rear opening. A metal tube extends through and projects beyond the plug seal bore and carries at its outer end a rotatable lock member which engages bayonette slots in the handle member and a compression spring entrapped between the lock member and plug seal.

The improved extractor device is rugged, reliable and convenient to use and is easy to clean and service. The receiver is simply rapidly removed and replaced for emptying and the tip and the conveyor tube are easily cleaned by merely separating the front and rear units. The separation of the units is facilitated by the electric cable being slidably housed in the handle member.

BRIEF DESCRIPTION OF THE DRAWINGS

FIG. 3 is a view taken along line 3—3 in FIG. 2;

FIG. 4 is a sectional view taken along line 4—4 in FIG. 2;

FIG. 5 is a sectional view taken along line 5—5 in FIG. 2;

FIG. 6 is a sectional view taken along line 6—6 in FIG. 6; and

FIG. 7 is a fragmentary front perspective view of the solder extractor shown with the front and rear sections thereof separated for servicing.

DESCRIPTION OF THE PREFERRED EMBODIMENT

Figure 1:
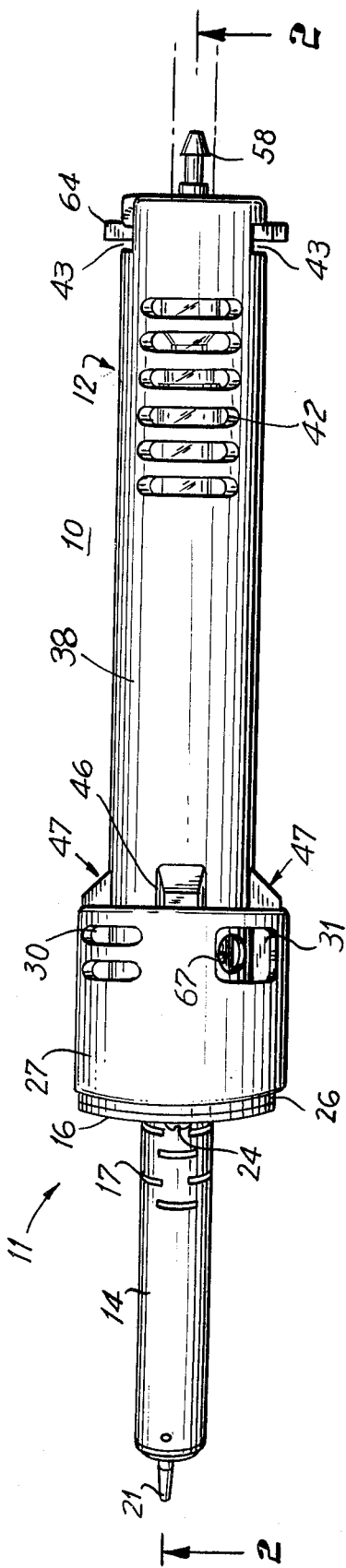
FIG. 1 is a top plan view of a solder extractor embodying the present invention.
Figure 2:
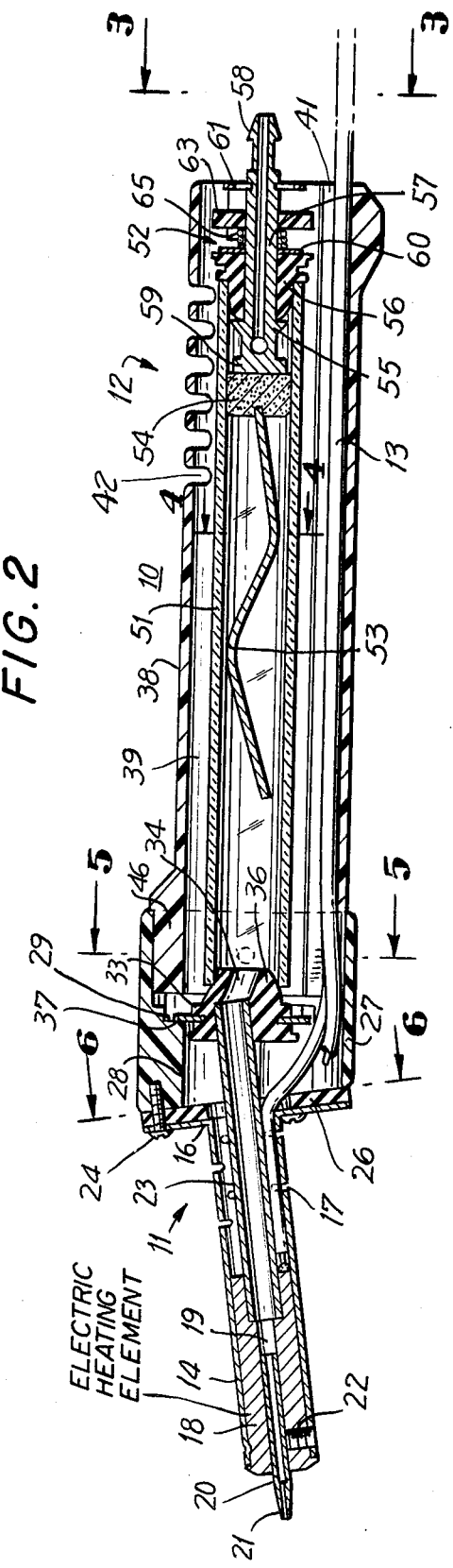
FIG. 2 is a sectional view taken along line 2—2 in FIG. 1.

Referring now to the drawings which illustrate a preferred embodiment of the present invention, the reference numeral 10 generally designates the improved solder extractor which includes a working section front unit 11, and a receiver and handle section rear unit 12 and a three wire electric cable 13 which extends through rear unit 12 to front unit 11. Front and rear units 11 and 12 are separably joined in an end to end arrangement and are readily separable to facilitate the repair and servicing of the solder extractor 10 and each unit is a self contained sub-assembly.

The front unit 11 includes a tubular stainless steel sleeve or bracket 14 which is oblique, preferably between 5° and 15° to the longitudinal axis of rear unit 12, and terminates at its rear in a peripheral flange 16. Longitudinally spaced and staggered peripherally interrupted circumferential vent slots 17 are formed in the rear portions of bracket 14.

Telescoping the front portion of tubular bracket 14 and firmly secured therein is a cylindrical heating member 18 having an axial bore 19 which is counterbored at its rear and tapped radial bore proximate its front end. The heating member 18 is of known construction and includes a copper body and an electrical resistance heating element. A tubular heating and solder extraction tip member 20 having a tapered front end 21 engages and projects forwardly of bore 19 and is releasably locked in bore 19 in good heat transfer relationship with heating member 18 by a set screw 22 engaging the tapped radial bore in heater member 18. A low thermal conductivity metal conveyor tube 23 engages the counterbored portion of bore 19 and projects coaxially beyond the rear of bracket 14.

Secured to the rear face of flange 16 by peripherally spaced screws 24 and separated from flange 16 by an annular compressible gasket 26 of a thermal insulating material is a cylindrical cowl 27 which is coaxial with rear unit 12 and has an oblique front face coaxial with front unit 11. The cowl 27 is formed of a thermal insulating material such as a heat resistant synthetic polymeric resin and has integrally formed in its front inner face a plurality of circumferentially spaced longitudinal ribs 28 which are stepped at their rear faces to form rearwardly facing inner shoulders 29. Formed in the peripheral wall of cowl 27 forward of ribs 28 are longitudinally spaced circumferentially interrupted peripheral slots 30 and 31 and a pair of diametrically opposed radial bores 32 counterbored at their outer ends.

A tubular plug or seal 33 is formed of a heat resistant elastomeric material such as silicone rubber and has an axial bore 34 which is snugly engaged by the trailing end of conveyor tube 23. The rear portion 36 of plug 33 is of frusto-conical shape and located rearwardly of shoulders 29 and a metal washer 37 engages a peripheral groove in plug 33 forward of rear portion 36 and firmly abuts the shoulder 29. The cowl 27 functions as a heat protective handle in the servicing of solder extractor 10 and as a heat barrier, venting and air circulating passageways being provided from the interior of bracket 14 through gasket 26 and along the cowl 27 between ribs 28 and through the rear of the cowl and slots 30 and 31 through the handle section 12 as indicated hereafter.

The rear unit 12 includes a longitudinally extending handle defining tubular member 38 formed of a thermal insulating material such as a synthetic organic polymeric resin and divided longitudinally into an upper receiver housing main compartment 39 and an electric cable housing longitudinal bottom channel 40 by transversely spaced opposed longitudinal flanges 41. Formed in the rear top of handle 38 are longitudinally spaced transverse window and vent slots 42 and formed in the rear trailing border of handle 38 is a pair of diametrically opposed bayonette slots 43 each including a peripheral section and a longitudinal section extending to the rear end of handle 38. The front border of channel 40 is open, as at 44. The cable 13 is slidably housed in and extends beyond the ends of channel 40, the current carrying conductors being carried to the electrical terminals of heater member 18 and the grounding conductor being connected to flange 24 and the outer end of cable 13 terminating in a three prong plug.

Longitudinally extending upper and diametrically opposed side ribs 46 and 47, respectively, are formed on the front outer face of handle 38, each of the ribs 46 and 47 being radially enlarged at its trailing end to provide a forwardly facing shoulder 48. The front end of handle 38 slidably projects into the cowl 27 to a point short of the trailing ends of cowl ribs 28 with the shoulders 48 abutting the rear edge of cowl 27, the recessed front portion channel 40 projecting into cowl 27 and the channel bottom wall being almost at the level of the bottom of cowl 27. The ribs 46 and 47 space the front upper and side outer faces of handle 38 from the confronting inside peripheral face of cowl 27. The handle 38 is releasably fastened to the cowl 27 by screws 49 engaged cowl bores 32 and axially aligned corresponding tapped radial bores 50 formed in ribs 47 to permit the separation of cowl 27 and handle 38 hence the front and rear units 11 and 12 respectively. Handle 38 has an opening or window 67, which when handle 38 is assembled with cowl 27, openings 67 and 30 are superposed to allow viewing of the interior.

Removably housed in handle compartment 39 is a longitudinally extending tubular collector or receiver 51 formed of a heat resistant thermal insulating perferrably transparent material such as a heat resistant glass, the open front end of receiver 51 separably engaging the tapered rear section 36 of plug 33 to form a hermetic seal therewith. The receiver 51 is coaxial with and spaced from the inside face of handle compartment 39. The rear opening of receiver 51 is sealed by a coupling carrying closure member 52 and located in the rear portion of receiver 51 is a solder trap 53 consisting of a longitudinally extending sinuous metal band joined at its end to a gas permeable cylindrical filter 54.

The closure member 52 includes an elastomeric plug 56 of the shape of plug 33, projecting into and sealing the receiver rear opening and a metal coupling member 55 including a tubular section 57 extending axially through plug 56. The tubular member 57 terminates at its rear in a tube coupling nipple 58 and at its front in an enlarged head 59 having radial bores communicating with the axial bore of section 57, the head 59 being of less diameter than and abutting filter member 54.

A metal washer 60 is superimposed on the rear face of plug 56 and a c-washer 61 engages a peripheral slot in section 57 forward of nipple 58. Rotatably engaging tubular section 57 forward of c-washer 61 is a locking member 63 having diametrically opposed radial arms 64 slidably releasably engaging bayonet slots 43 in handle 38. A helical compression spring 65 is entrapped between washer 60 and lock member 63 and in the assembled condition of units 11 and 12 is loaded and urges the front end of receiver 51 into sealing engagement with plug 33.

In the operation of solder extractor 10 the nipple 58 is coupled to a flexible tube which is connected through a foot operated valve or actuator to a suction or vacuum source and the extractor 10 is employed in the known manner, the solder joint or fillet being melted by the heater tip 21 and then suction applied to draw the molten solder through tip 21 into receiver 51. In order to empty the receiver 51 of accumulated solder, the lock member 63 is rotated to release it from bayonette slots 43 whereupon compression spring 65 is relieved and the assembled receiver 51 and closure member 52 are withdrawn from handle compartment 39 thereby permitting the emptying of receiver 51 of solder. The emptied receiver 51 is then replaced in the handle compartment 39 in a sealed condition and locked in position by lock member 63.

To service the front unit 11, such as when solder accumulates in the passageways along a tip 20 and tube 23, the two screws 49 are merely removed and the front and rear units 11 and 12 separated by grasping cowl 27 and handle 38 and pulling them apart, this being conveniently accomplished since the cowl and handle are always cool enough to handle and the electrical cable 13 slidably in channel 40. The front and rear units are reassembled and fastened by screws 49 following their servicing.

Viewing the front end of receiver 51 through windows 31 and 67 allow detection of solder beginning to build up which normally precedes clogging of the tip 20 and tube 23. The tube can be emptied quickly before the tip gets clogged which necessitates a longer shut down.

The flow of air through the windows and slots 30 and 31 in the cowl 27 and around the handle 38 between the cowl 27 and the handle 38 and then into the interior of handle 38 and out the rear end of handle 38 reduces the temperature of the handle.

While there has been described and illustrated a preferred embodiment of the present invention, it is apparent that numerous alterations, omissions and additions may be made without departing from the spirit thereof.

I claim:

1. A solder extractor device comprising: a working front unit including a hollow rear cowl member with front and rear openings and formed of a heat insulating material, an elongated tubular bracket secured to the front of and projecting forwardly from said cowl member with the longitudinal axis of the bracket being oblique to the longitudinal axis of the cowl member, an electrical heating member having an axial bore positioned in the forward end of said bracket, a tubular tip member telescoping the forward end of said bore and projecting forwardly thereof and separably secured to said heating member, a conveyor tube extending rearwardly from said heating member and communicating with said bore and a tubular first seal member engaging the rear end of said conveyor tube and located within said cowl; a rear unit projecting rearwardly from said cowl member and separably secured thereto and including an elongated tubular outer handle member formed of a heat insulating material and being coaxial with said cowl member, said outer handle member being detachably secured to the rear of said cowl member, a tubular receiver disposed in said handle member and having an open front end releasably engaging said first seal member and a rear open end, and a closure member engaging said receiver member rear open end and having a passageway therethrough communicating with the rear of the receiver and a conduit coupling communicating with said passageway; and an electric power line cable freely slidably extending into the rear end of the handle member and through a longitudinal passageway in the rear unit into the front unit and being fixedly connected to said heating member, said rear unit, when said handle member is detached from said cowl member, being rearwardly slidable on said power cable to permit the separation of said front and rear units.

2. The device of claim 1 wherein said receiver is spaced from the inside face of said handle member to delineate a longitudinal passageway therebetween.

3. The device of claim 1 wherein said longitudinal channel slidably housing said electrical power cable is formed in said handle member.

4. The device of claim 1 wherein the rear portions of said cowl and handle members have vent openings formed therein for venting the interior of said members.

5. The device of claim 4 wherein said tubular handle member extends into said cowl member and has peripherally spaced longitudinal ribs integrally formed in the front outer face of said handle member and projecting into said cowl member to delineate longitudinal air flow passageways between the confronting peripheral faces of said cowl and handle members.

6. The device of claim 5 wherein at least one of said ribs has a tapped radial bore and said cowl member has an aperture in axial alignment with said bore, and including a screw engaging said cowl aperture and rib bore to detachably secure said handle member to said cowl member.

7. The device of claim 5 wherein the inner surface of said handle member is spaced from the outer surface of said receiver to form an air flow passage therebetween to the rear vent openings in said handle member and said longitudinal passageways communicate with said passage, whereby air flows between the cowl and handle members, into the handle member and through the vent openings in the handle member.

8. The device of claim 1 wherein the rear portion of said cowl member and the front portion of said handle have registering openings therein overlying the front end of said tubular receiver and said receiver has a transparent portion in registration with said registering openings to provide visual access to said receiver.

* * * * *